US012327257B1

(12) United States Patent
Bowman et al.

(10) Patent No.: US 12,327,257 B1
(45) Date of Patent: Jun. 10, 2025

(54) FRESH FOOD RETURN PROCESSING SYSTEM AND RELATED METHODS

(71) Applicant: Inmar Clearing, Inc., Winston-Salem, NC (US)

(72) Inventors: Jacob Bowman, Greensboro, NC (US); Pam Forster, King of Prussia, PA (US); Leonel Jerez, Pfafftown, NC (US); Seth Maxwell, Lewisville, NC (US)

(73) Assignee: INMAR CLEARING, INC., Winston-Salem, NC (US)

( * ) Notice: Subject to any disclaimer, the term of this patent is extended or adjusted under 35 U.S.C. 154(b) by 255 days.

(21) Appl. No.: 18/098,639

(22) Filed: Jan. 18, 2023

(51) Int. Cl.
| | |
|---|---|
| *G06Q 30/016* | (2023.01) |
| *G06Q 30/02* | (2023.01) |
| *G06Q 30/06* | (2023.01) |
| *G06Q 30/0601* | (2023.01) |
| *G06V 10/774* | (2022.01) |
| *G06V 20/68* | (2022.01) |
| *G06V 30/19* | (2022.01) |
| *G06Q 30/0207* | (2023.01) |

(52) U.S. Cl.
CPC ....... *G06Q 30/016* (2013.01); *G06Q 30/0609* (2013.01); *G06V 10/774* (2022.01); *G06V 20/68* (2022.01); *G06V 30/191* (2022.01); *G06Q 30/0222* (2013.01)

(58) Field of Classification Search
None
See application file for complete search history.

(56) References Cited

U.S. PATENT DOCUMENTS

| | | | |
|---|---|---|---|
| 10,825,084 B1* | 11/2020 | Fitzgerald | G06N 3/084 |
| 11,157,917 B2* | 10/2021 | Patil | G06N 20/00 |
| 12,102,259 B2* | 10/2024 | Liu | G05B 19/042 |
| 2005/0068190 A1* | 3/2005 | Krause | G06Q 30/06 |
| | | | 340/4.31 |

(Continued)

OTHER PUBLICATIONS

Gokhale, S., "AI And Written Description: When Does An AI Patent Claim Cross the Line?" Mondaq Business Briefing, Jun. 29, 2021. (Year: 2021).*

(Continued)

*Primary Examiner* — Nicholas D Rosen
(74) *Attorney, Agent, or Firm* — ALLEN, DYER, DOPPELT, + GILCHRIST, P.A. Attorneys at Law (57) ABSTRACT

A fresh food return processing system may include a mobile wireless communications device associated with a user to obtain an image of a previously purchased fresh food product, and initiate a mobile return of the previously purchased fresh food product based upon the image. A server may store a product purchase history associated with the user, obtain the image from the mobile wireless communications device, and provide the image to a machine learning algorithm to train the machine learning algorithm to identify the previously purchased fresh food product from the image. The server may also verify a purchase by the given user based upon comparing the identification of the image via the machine learning algorithm and the product purchase history associated with the given user, and generate and communicate a user credit redeemable toward a future purchase based upon verifying the purchase by the user.

24 Claims, 8 Drawing Sheets

(56) References Cited

U.S. PATENT DOCUMENTS

| | | | |
|---|---|---|---|
| 2009/0257590 A1* | 10/2009 | Ding | H04L 9/0825 |
| | | | 380/247 |
| 2017/0103436 A1* | 4/2017 | Yonaha | G06Q 30/0201 |
| 2017/0193592 A1* | 7/2017 | Avidan | G06Q 10/087 |
| 2019/0164116 A1* | 5/2019 | Wallace | G06V 20/20 |
| 2019/0226755 A1 | 7/2019 | Johnston | |
| 2019/0286896 A1* | 9/2019 | Wyle | G06V 30/416 |
| 2020/0151735 A1* | 5/2020 | Patil | G06Q 30/0185 |
| 2020/0372235 A1* | 11/2020 | Peng | G06T 7/0012 |
| 2021/0228022 A1* | 7/2021 | Liu | G05B 13/027 |
| 2022/0148172 A1* | 5/2022 | Klochko | G06V 10/25 |
| 2022/0253320 A1* | 8/2022 | Satdarov | G06F 16/958 |
| 2022/0299493 A1* | 9/2022 | Pattison | G01N 21/3563 |
| 2023/0196802 A1* | 6/2023 | Gong | G06V 20/68 |
| | | | 382/110 |

OTHER PUBLICATIONS

Pradeep Kumar, R.; Nagabushan, P., "Approach based on regression line features for low complexity content based image retrieval ,An", [Abstract only] Proceedings—International Conference on Computing: Theory and Applications, ICCTA 2007: 600-604. IEEE Computer Society. (Aug. 9, 2007). (Year: 2007).*

* cited by examiner

FRESH FOOD RETURN PROCESSING SYSTEM AND RELATED METHODS

TECHNICAL FIELD

The present invention relates to the field of food processing, and, more particularly, to processing fresh food returns and related methods.

BACKGROUND

Returning of a purchased item is sometimes part of the retail process. Returning of a purchased item to a retailer may involve the purchaser taking the purchased item, mostly along with a receipt, back to the retailer in exchange for a refund, exchange, merchandise credit, etc.

For online purchases, for example, returning of a purchased item may include requesting a return authorization from the retailer, repackaging the purchased item in a box or acceptable shipping container, affixing return shipping information to the box or container, and placing the box or container including the purchased item and return shipping information with the appropriate shipping provider. A retailer, may, in some instances, instruct that the purchased item, when purchased online, be returned to a physical store.

A retailer that may sell food, for example, may have different procedures for returning a purchased food item. For example, a retailer that sells food items may instruct that the purchased item be discarded rather than packaged and returned, or returned to a physical store.

SUMMARY

A fresh food return processing system may include a mobile wireless communications device associated with a given user. The mobile wireless communications device may be configured to obtain an image of a previously purchased fresh food product, and initiate a mobile return of the previously purchased fresh food product based upon the image. The fresh food return processing system may also include a fresh food return processing server. The fresh food return processing server may be configured to store a product purchase history associated with the given user, obtain the image of the previously purchased fresh food product from the mobile wireless communications device, and provide the image of the previously purchased fresh food product to a machine learning algorithm to train the machine learning algorithm to identify the previously purchased fresh food product from the image.

The fresh food return processing server may also be configured to verify a purchase by the given user of the previously purchased fresh food product based upon comparing the identification of the image of the previously purchased fresh food product via the machine learning algorithm and the product purchase history associated with the given user, and generate and communicate a user credit redeemable toward a future purchase based upon verifying the purchase by the given user.

The fresh food return processing server may be configured to generate and communicate a digital promotion redeemable toward a future purchase of a given product for purchase based upon verifying the purchase by the given user, for example. The fresh food return processing server may be configured to generate a risk score associated with the given user based upon a number of previously returned products, and generate and communicate the user credit based upon the risk score.

The fresh food return processing server may be configured to discontinue the mobile return based upon the risk score, for example. The fresh food return processing server may be configured to cooperate with the mobile wireless communications device to prompt the given user to return the previously purchased fresh food product at a physical store, for example.

The fresh food return processing server may be configured to determine, based upon the machine learning algorithm, a determined reason for the mobile return, and cooperate with the mobile wireless communications device to prompt the given user to provide a stated reason for the mobile return. The fresh food return processing server may also be configured to train the machine learning algorithm with respect to the determined reason based upon the stated reason for the mobile return, for example.

The fresh food return processing server may be configured to prompt the given user to provide a user identifier, obtain the user identifier from the mobile wireless communications device, and obtain the product purchase history based upon the user identifier. The fresh food return processing server may be configured to obtain a receipt image having the previously purchased fresh food product thereon, and perform an optical character recognition of the receipt image to obtain at least one purchased product description. The fresh food return processing server may also be configured to verify the purchase of the previously purchased fresh food product based upon comparing the identification of the image of the previously purchased fresh food product to the at least one purchased product description, for example.

A method aspect is directed to a method of processing a fresh food return. The method may include using a fresh food return processing server to store a product purchase history associated with a given user, and obtain an image of a previously purchased fresh food product from a mobile wireless communications device associated with the given user upon initiating a mobile return of the previously purchased fresh food product based upon the image. The method may also include using the fresh food return processing server to provide the image of the previously purchased fresh food product to a machine learning algorithm to train the machine learning algorithm to identify the previously purchased fresh food product from the image, and verify a purchase by the given user of the previously purchased fresh food product based upon comparing the identification of the image of the previously purchased fresh food product via the machine learning algorithm and the product purchase history associated with the given user. The method may also include using the fresh food return processing server to generate and communicate a user credit redeemable toward a future purchase based upon verifying the purchase by the given user.

A computer readable medium aspect is directed to a non-transitory computer readable medium for processing a fresh food return. The non-transitory computer readable medium includes computer executable instructions that when executed by a processor cause the processor to perform operations. The operations may include storing a product purchase history associated with a given user, and obtaining an image of a previously purchased fresh food product from a mobile wireless communications device associated with the given user upon initiating a mobile return of the previously purchased fresh food product based upon the image. The operations may also include providing the image of the previously purchased fresh food product to a machine learning algorithm to train the machine learning algorithm to identify the previously purchased fresh food product from the image. The operations may further include verifying a purchase by the given user of the previously purchased fresh food product based upon comparing the identification of the image of the previously purchased fresh food product via the machine learning algorithm and the product purchase history associated with the given user, and generating and communicating a user credit redeemable toward a future purchase based upon verifying the purchase by the given user.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime and multiple prime notation is used to indicate similar elements in alternative embodiments.

Figure 1:
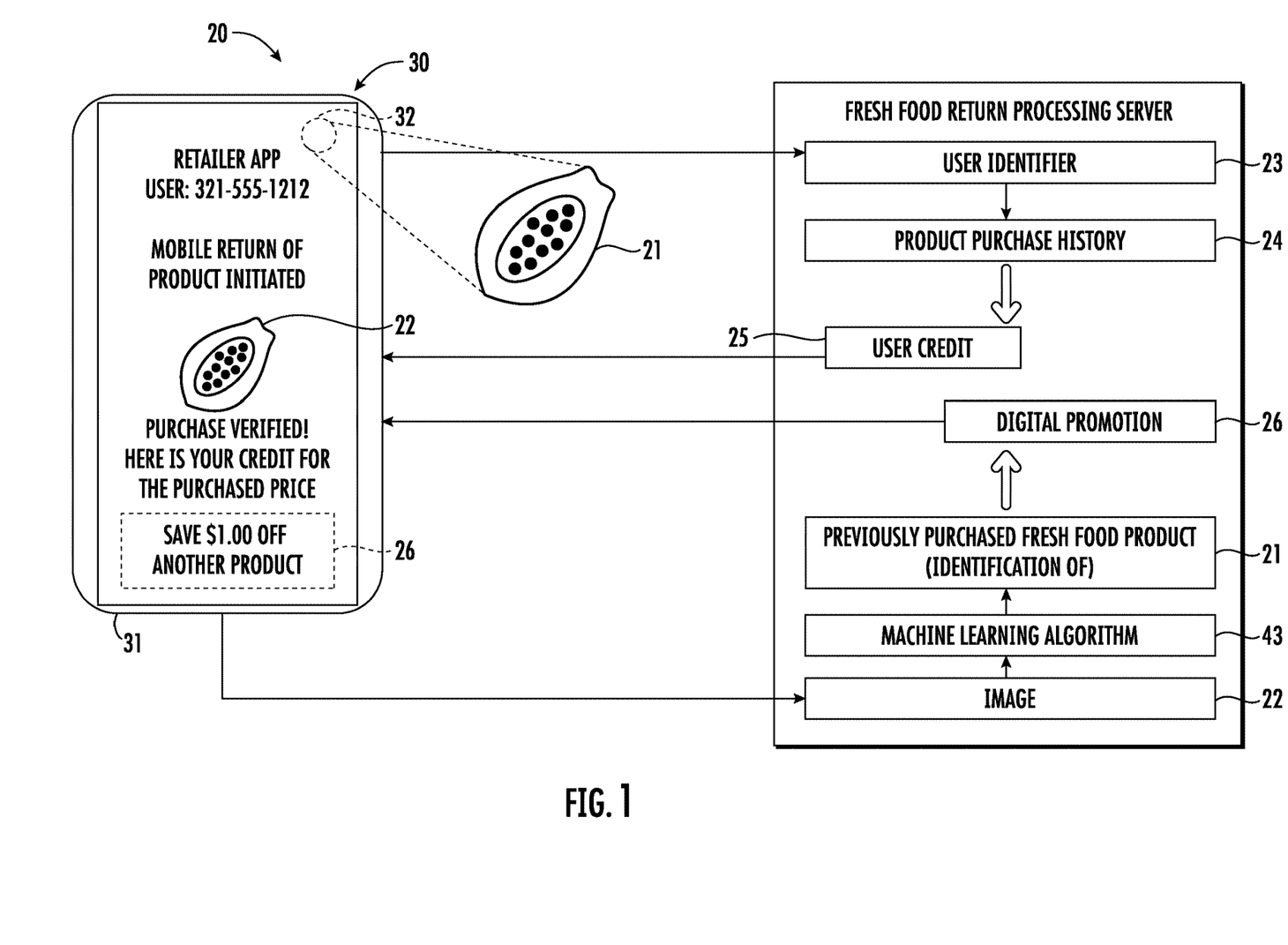
FIG. 1 is a schematic diagram of a fresh food return processing system in accordance with an embodiment.
Figure 2:
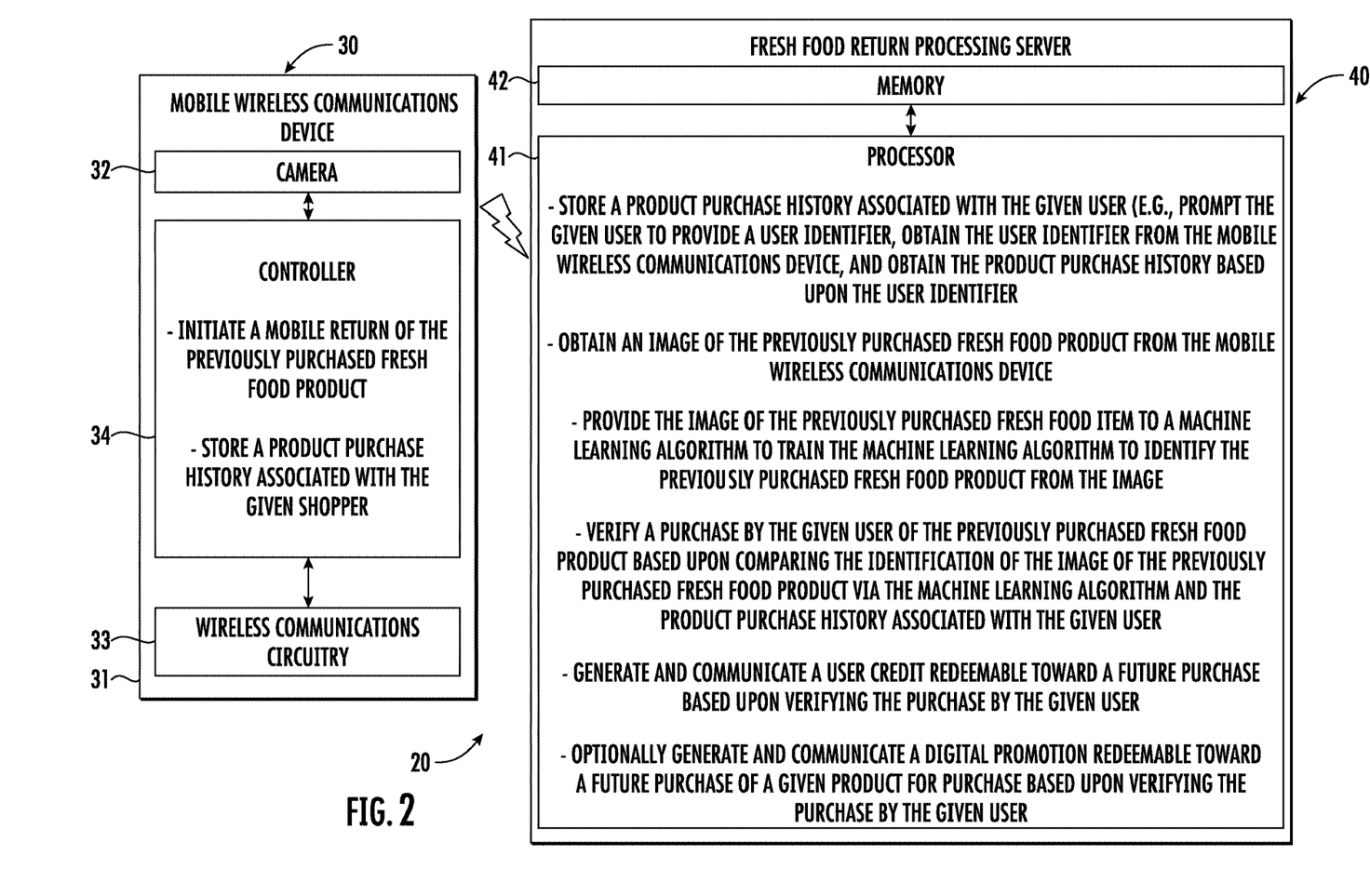
FIG. 2 is a schematic block diagram of the fresh food return processing system of FIG. 1.

Referring initially to FIGS. 1 and 2, a fresh food return processing system 20 includes a mobile wireless communications device 30 associated with a given user. The mobile wireless communications device 30 is illustratively in the form of a mobile phone or smartphone. The mobile wireless communications device 30 may be in another form, for example, a tablet computer, personal computer, laptop computer, or wearable device.

The mobile wireless communications device 30 illustratively includes a housing 31 and a camera 32 carried by the housing. Wireless communications circuitry 33 is also carried by the housing 31 and may include long-range and short-range wireless communications circuitry, for example, Bluetooth, WiFi, cellular, near-field communications (NFC), etc. A controller 34 is also carried by the housing 31 and coupled to the wireless communications circuitry 33 and cooperates therewith to perform one or more wireless communications functions.

While operations of the mobile wireless communications device 30 are described herein, it should be understood that the controller 34 cooperates, for example, with the camera 32 and/or wireless communications circuitry 33 to perform the operations. The mobile wireless communications device 30 obtains an image 22 of a previously purchased fresh food product 21. For example, the controller 34 may cooperate with the camera 32 to obtain the image 22 of the previously purchased fresh food product 21. The image 22 of the previously purchased fresh food product 21 may be obtained, for example, wirelessly, from another user or camera that may not be carried by the mobile wireless communications device 30.

The previously purchased fresh food product 21 may be a food product that the given user purchased in the past, for example, at a grocery store, and that may be considered fresh such that eating of the food product may be undesirable. The fresh food product 21 may be contrasted to a packaged food product, for example, and have a relatively short expiration or use-by date relative to a packaged good. Examples of a fresh food product 21 may include fresh produce, milk, and/or juice. As will be appreciated by those skilled in the art, a fresh food product 21 may develop mold, begin to decay, and/or become sour (i.e., inedible) after a relatively short time, for example, a few weeks from placement on sale at a grocery store.

The mobile wireless communications device 30 initiates a mobile return of the previously purchased fresh food product 21 based upon the image 22. More particularly, the given user, via an application or website associated with the retailer at which they purchased the previously purchased fresh food product 21, may provide input that would initiate a return. The given user may select the previously purchased fresh food product 21 from items in a previous order via a graphical user interface (GUI), and indicate a desire to return the previously purchased fresh food product. The given user may be prompted, in some instances, to provide a reason for the return. As will be appreciated by those skilled in art, in some instances, fresh food products may spoil well ahead of the sell or use-by date or a short time after purchase, which may dissatisfy a given user or shopper.

The fresh food return processing system 20 also includes a fresh food return processing server 40. The fresh food return processing server 40 includes a processor 41 and an associated memory 42. While operations of the fresh food return processing system 20 are described herein, the processor 41 and the memory 42 cooperate to perform the operations.

Figure 3:
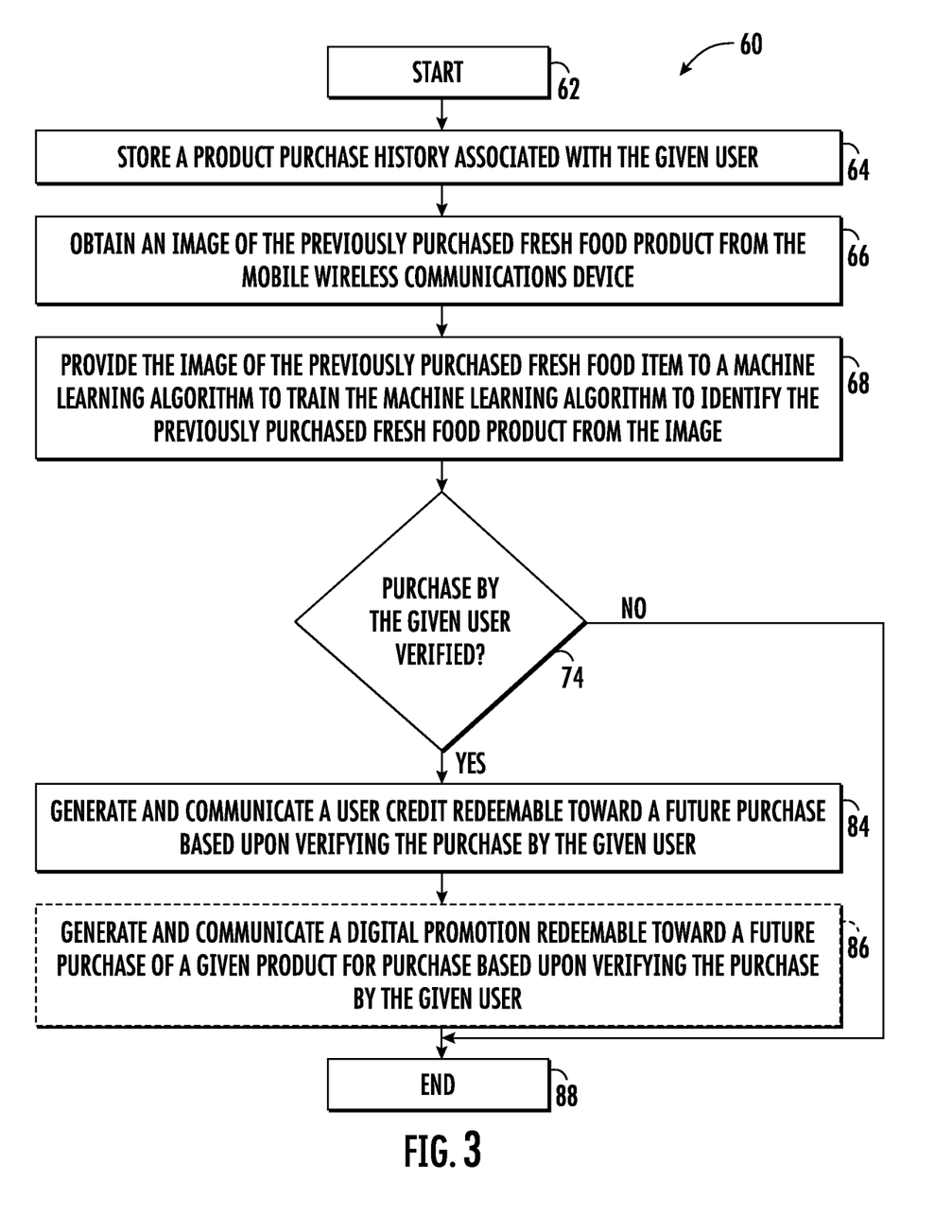
FIG. 3 is a flow diagram illustrating operation of the fresh food return processing server of FIG. 1.

Referring now to the flowchart 60 in FIG. 3, beginning at Block 62, operations of the fresh food return processing server 40 will now be described. At Block 64, the fresh food return processing server 40 stores a product purchase history 24 associated with the given user. The given user may have a user identifier 23 associated therewith, for example, a username, phone number, email address, and/or loyalty account identifier. The user identifier 23 may be stored along with a listing of previously purchased products including, for example, product identifiers (i.e., uniform product codes (UPCs), produce lookup units (PLUs), and/or stock keeping units (SKUs)), product descriptions, date and time of purchase, price paid, quantities, and whether or not promotions or coupons were applied to products or used toward the purchase.

The fresh food return processing server 40 may cooperate with the mobile wireless communications device 30 to prompt the given user to provide the user identifier 23 via input, such as via a touch-display, to the mobile wireless communications device. The fresh food return processing server 40 may obtain the user identifier 23 from the mobile wireless communications device 30 and obtain, or retrieve, the product purchase history 24 based upon the user identifier.

The fresh food return processing server 40, at Block 66, obtains the image 22 of the previously purchased fresh food product 21 from the mobile wireless communications device 30. The mobile wireless communications device 30 may wirelessly send the image 22 upon initiating the mobile return, for example, or alternatively, the fresh food return processing server 40 may prompt the mobile the wireless communications device to wirelessly communicate the image upon initiating the mobile return, or retrieve the image from the mobile wireless communications device.

At Block 68, the fresh food return processing server 40 provides, as input thereto, the image 22 of the previously purchased fresh food product 21 to a machine learning algorithm 43. The image 22 trains the machine learning algorithm 43 to identify the previously purchased fresh food product 21 from the image 22. More particularly, as the image 22 is identified using image recognition techniques, such as pixel matching to a baseline image, the machine learning algorithm 43 may update the machine learning algorithm, or conceptually the baseline image, based upon the image. For example, if the previously purchased fresh food product 21 is a lemon, the machine learning algorithm 43 may identify it as such based upon the color, shape, and size. However, variations in lemons, such as shape and size, may be learned based upon the image 22 so that the previously purchase fresh food product 21 can more accurately identified from the image. Additionally, variations indicative of imperfections or spoliation may also be learned, for example, spotting decay via color, shape, texture, etc.

The fresh food return processing server 40 verifies a purchase by the given user of the previously purchased fresh food product 21 based upon comparing the identification of the image 22 of the previously purchased fresh food product via the machine learning algorithm 43, and the product purchase history 24 associated with the given user (Block 74). In other words, the machine learning algorithm 43 outputs the identification of the previously purchased fresh food product 21 (e.g., product identification, description), and compares the output to the product purchase history 24 to find a match (e.g., matching product identification, description).

If there is a match (Block 74), or if it is verified that the given user previously purchased the previously purchased fresh food product 21, the fresh food return processing server 40 generates and communicates a user credit 25 redeemable toward a future purchase based upon verifying the purchase by the given user (Block 84).

The fresh food return processing server 40, at Block 86, and upon verification (Block 74), may generate and communicate a digital promotion 26, for example, a digital coupon, which is redeemable toward a future purchase of a given product for purchase. The digital promotion 26 may redeemable toward a same product as the previously purchased fresh food product 21 and/or a same brand as the previously purchased fresh food product. The digital promotion 26 may be redeemable toward another product, for example, a competitor brand or product to the previously purchased fresh food product 21, and/or a companion product that is typically purchased together with the previously purchased fresh food product. If, at Block 74, the purchase cannot be verified, such as, there is no match based upon the comparison, the operations end at Block 88.

Figure 4:
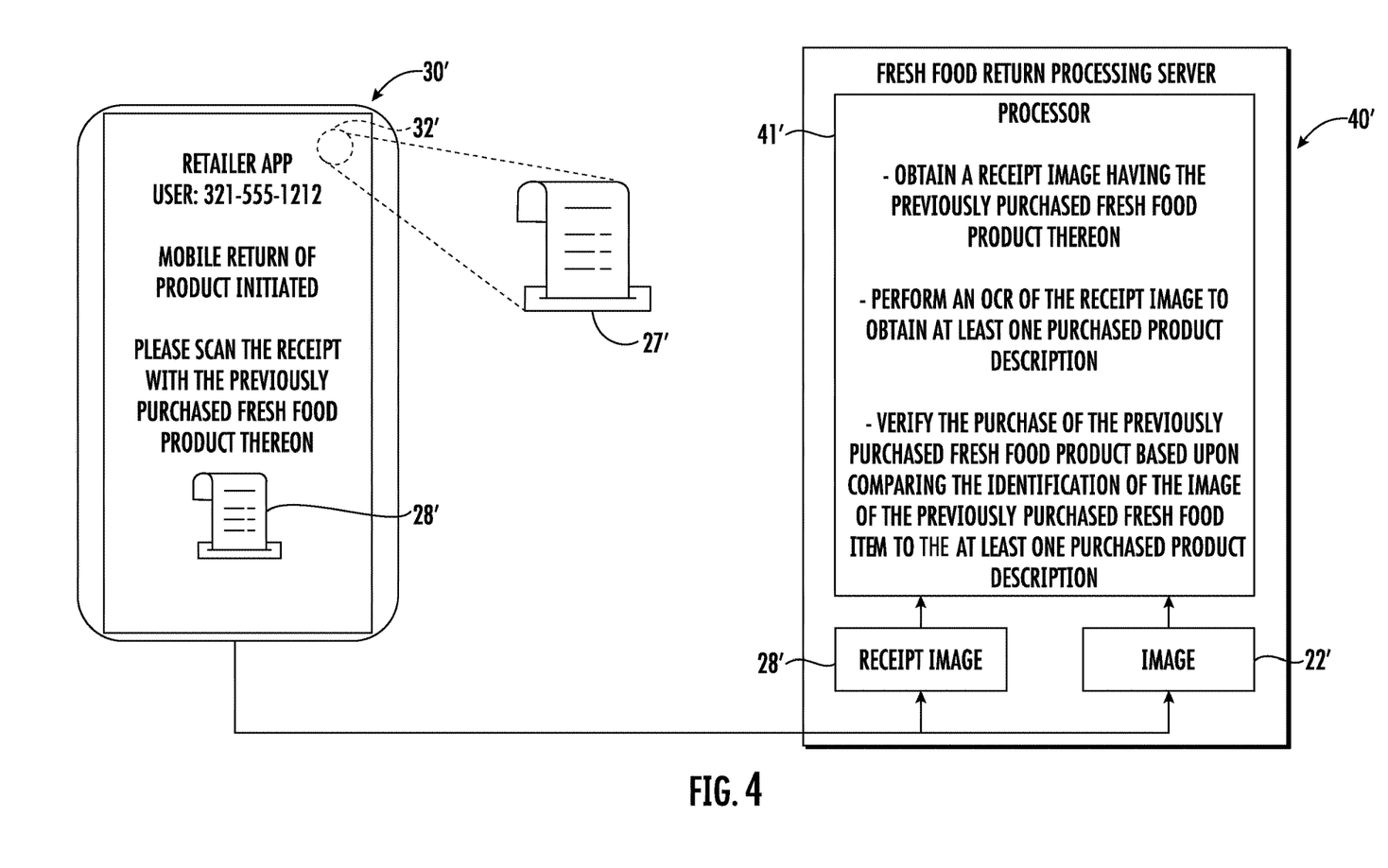
FIG. 4 is a schematic diagram of a fresh food return processing system in accordance with another embodiment.
Figure 5:
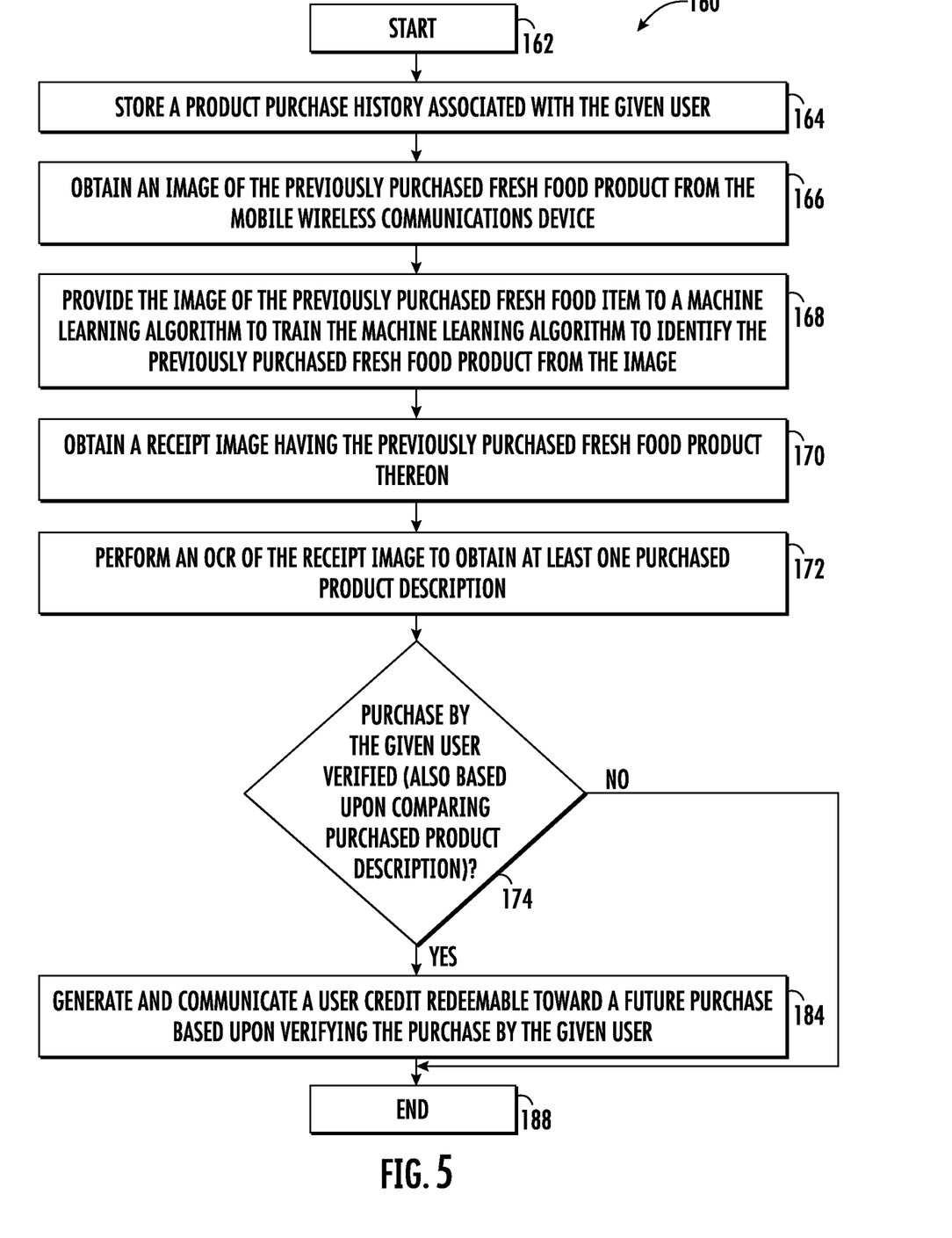
FIG. 5 is a flow diagram of the fresh food return processing server of FIG. 4.

Referring now to FIG. 4 and the flowchart 160 in FIG. 5, in another embodiment, for additional verification or as part of the verification process, the fresh food return processing server 40', by way of the processor 41', may obtain a receipt image 28' of a receipt 27' having the previously purchased fresh food product listed thereon (Block 170). More particularly, the fresh food return processing server 40' may cooperate with the mobile wireless communications device 30' to prompt the given user to capture, for example, via the camera 32', the receipt 27' as part of the mobile return process.

The fresh food return processing server 40' performs an optical character recognition (OCR) of the receipt image 28' to obtain product descriptions from the receipt image (Block 172). At Block 174, the fresh food return processing server 40' additionally verifies the purchase of the previously purchased fresh food product based upon comparing the identification of the image of the previously purchased fresh food product 22' to a matching one (i.e., the corresponding one) of the purchase product descriptions from the receipt image 28'. The fresh food return processing server 40' generates and communicates a user credit redeemable toward a future purchase based upon verifying the purchase by the given user as described above (Block 184). Other operations, such as, for example, storing the product purchase history (Block 164), obtaining the image of the previously purchased fresh food product 22' (Block 166), and providing the image of the previously purchased fresh food product to the machine learning algorithm (Block 168) are similar to those described above. Operations end at Block 188.

Figure 6:
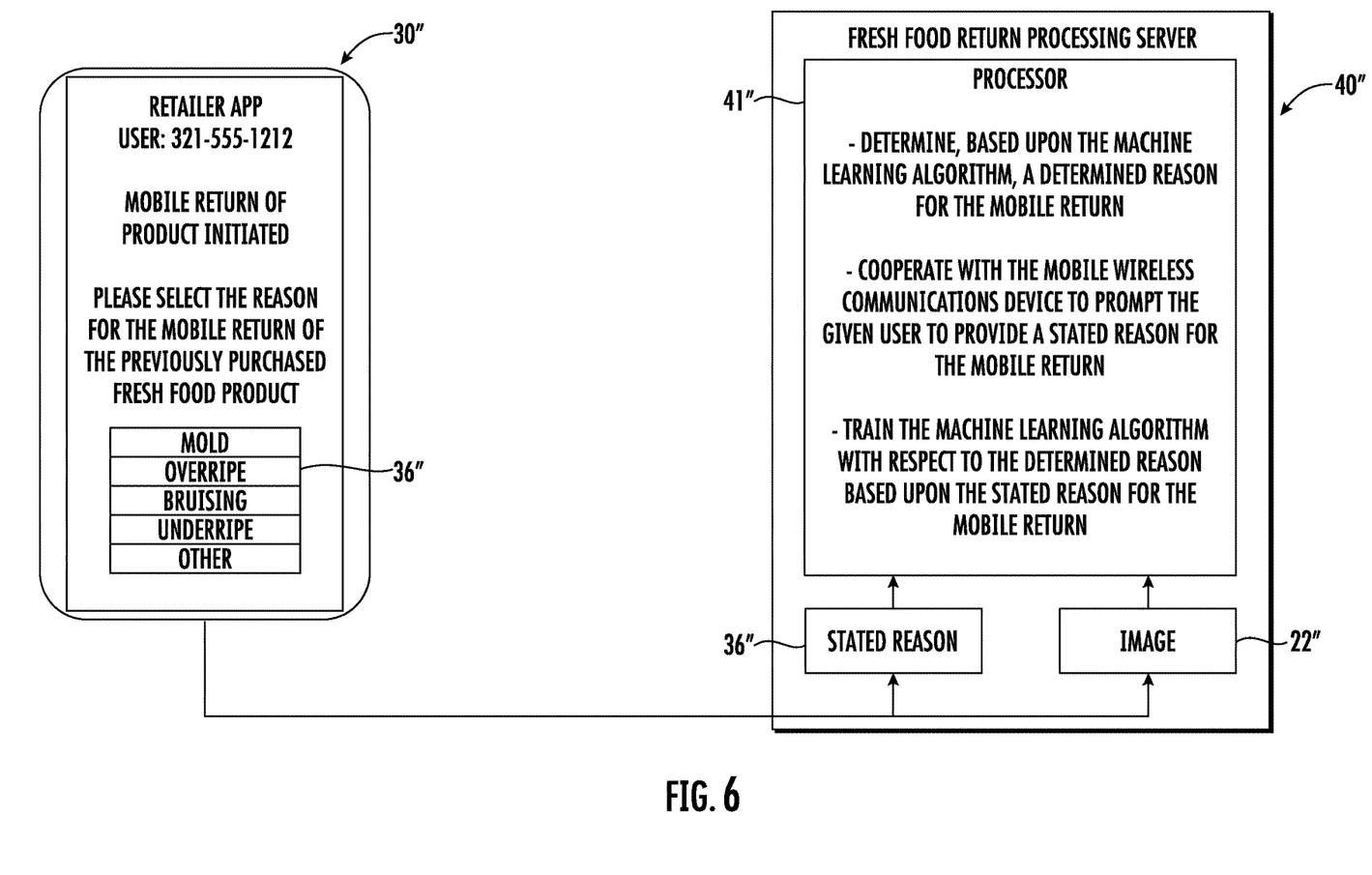
FIG. 6 is a schematic diagram of a fresh food return processing system in accordance with another embodiment.

Referring now to FIG. 6, in another embodiment, the fresh food return processing server 40" may additionally learn the reasons for return. More particularly, the fresh food return processing server 40" may determine, based upon the machine learning algorithm, a determined reason for the return. For example, the fresh food return processing server 40" may identify a characteristic of the image 22" of the previously purchased fresh food product that may correspond to mold or bruising (i.e., in the case of a fruit). The fresh food return processing server 40" may cooperate with the mobile wireless communications device 30" to prompt, for example, via the display of the mobile wireless communications device, the given user to provide a stated reason 36" for the mobile return. The stated reason 36" may be selected, for example, by way of a pull-down menu of available options, and communicated to the fresh food return processing server 40". The fresh food return processing server 40" may train the machine learning algorithm with respect to the determined reason based upon the stated reason for the mobile return. In other words, if the determined reason for the mobile return, in the case of a fruit, for example, is decay or mold, or even if the fresh food return processing server cannot determine a reason (e.g., visibly), and the stated reason for the mobile return is "overripe", the fresh food return processing server may train the machine learning algorithm that with respect to the image 22" of the previously purchased fresh food product, that image may not necessarily correspond to decay, mold, or even no visible reason.

By obtaining the reasons for the mobile return, a retailer and/or manufacturer may become aware of potential issues either with the product and/or supply chain, for example, delays that may cause the previously purchased fresh food product to spoil quicker or sooner than expected given the product supply chain cycle. The training of the machine learning algorithm, with respect to reasons for the mobile return, may be metered (i.e., more or less weight) based upon other factors, such as, for example, a risk score associated with the given user.

Figure 7:
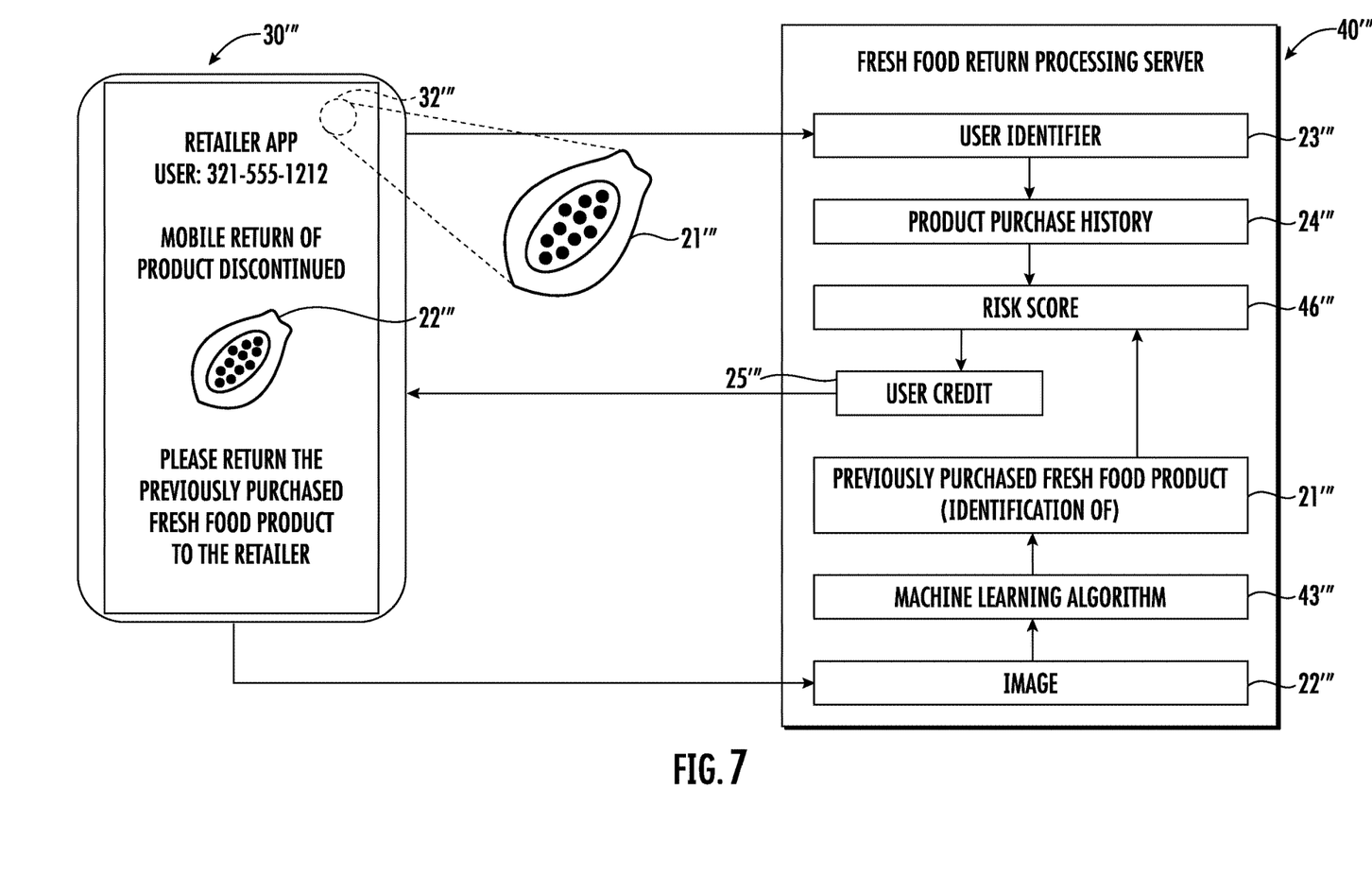
FIG. 7 is a schematic diagram of a fresh food return processing system in accordance with another embodiment.
Figure 8:
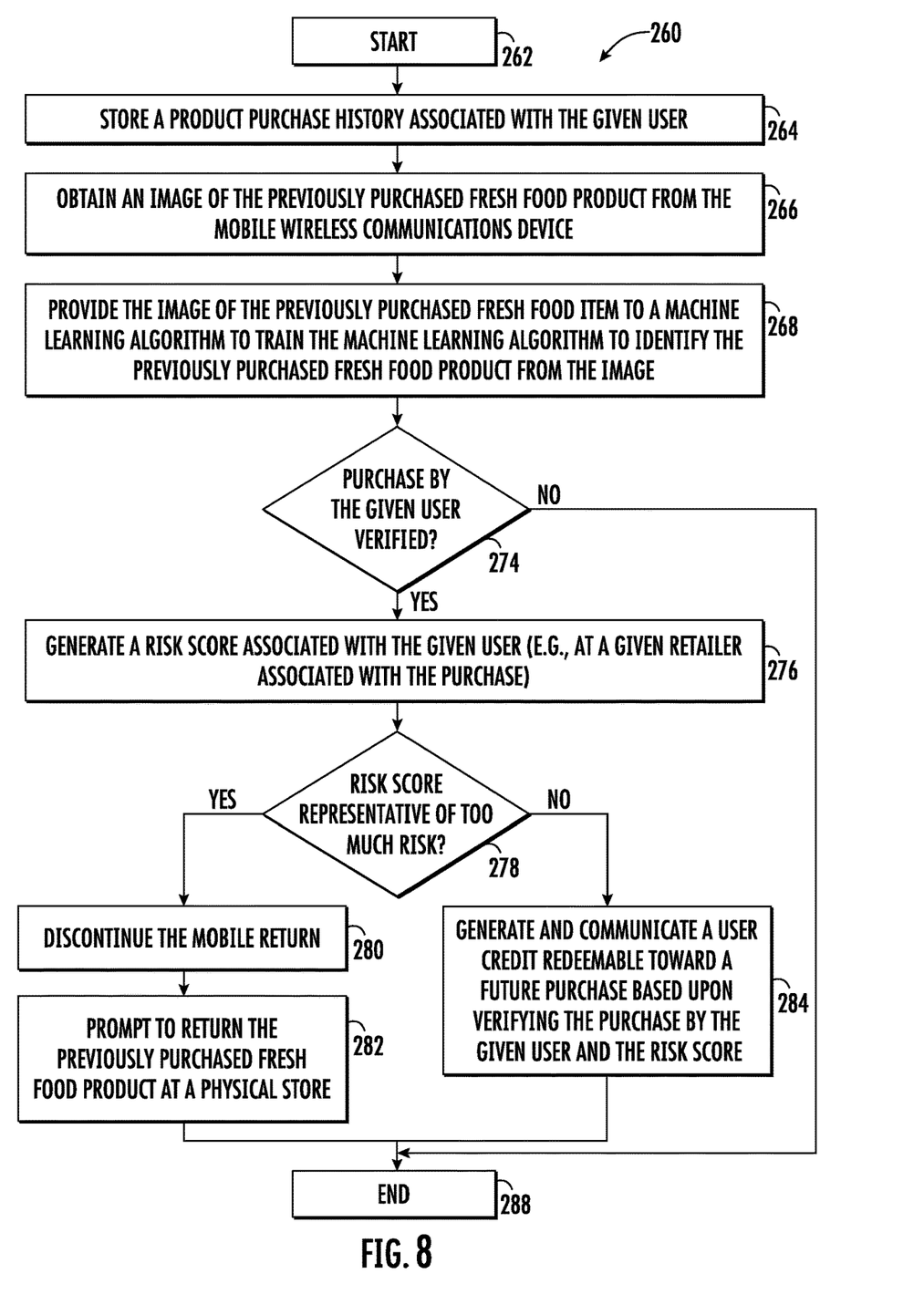
FIG. 8 is a flow diagram of operation of the fresh food return processing server of FIG. 7.

Referring now to FIG. 7 and the flowchart 260 in FIG. 8, beginning at Block 262, in another embodiment, the fresh food return processing server 40''' may, after or concurrently with verifying the purchase (Block 274) generate and communicate the user credit 25''' based upon a risk score 46''' associated with the given user and at the given retailer. More particularly, the fresh food return processing server 40''' generates the risk score 46''' based upon a number of previously returned products (Block 276). For example, if the given user more frequently returns previously purchased items (e.g., fresh and/or package) relative to other users or shoppers, the risk score associated with the given user or shopper may be higher indicative of a higher risk. A higher risk score 46''' may be indicative of or a representation of the given shopper's return activity being dubious, for example.

The fresh food return processing server 40''' may generate the risk score 46''' by obtaining returns with a given retailer based upon the user identifier 23''' and the product purchase history 24''' including dates, purchase amounts, and return amounts. The fresh food return processing server 40''' may also generate the risk score 46''' based upon the verification and/or identification of the previously purchased fresh food product 21''' as determined based upon the image 22''' and the machine learning algorithm 43'''. In other words, the fresh food return processing server 40''' may also determine the risk score 46''' based upon the previously purchased fresh food product 21''' itself (i.e., type, price, etc.).

The fresh food return processing server 40''' may operate a machine learning algorithm 43''' to determine the risk score 46''', for example, by providing the above data as input to the machine learning algorithm to generate the risk score. Other users or shoppers may be considered as input to or a baseline for the machine learning algorithm 43'''. Other and/or additional factors may be considered for determining the risk score 46''', for example, the time period between purchase and the initiation of the mobile return, the previously purchased fresh food product 21''', the use-by or sell-by dates, and/or the stock dates.

If, at Block 278, the fresh food return processing server 40''' determines that the risk score 46''' is representative that the mobile return may be dubious (e.g., too high), the fresh food return processing server may discontinue the mobile return (Block 280). The fresh food return processing server 40''' may then cooperate with the mobile wireless communications device 30''' to prompt the given user to return the previously purchased fresh food product 21''' at a physical store, for example, associated with a retailer where the previously purchased fresh food product was purchased (Block 282) where the return can be completed in-person before ending at Block 288. If at Block 278 the risk score is representative of a proper mobile return, the fresh food return processing server 40''' generates and communicates the user credit 25''' as described above (Block 284). Other operations, such as, for example, storing the product purchase history (Block 264), obtaining the image 22''' of the previously purchased fresh food product 21''' (e.g., from the camera 32''' of the mobile wireless communications device 30''') (Block 266), providing the image of the previously purchased fresh food product to the machine learning algorithm 43''' (Block 268), and verifying the purchase (Block 274) are similar to those described above. Operations end at Block 288.

A method aspect is directed to a method of processing a fresh food return. The method includes using a fresh food return processing server 40 to store a product purchase history 24 associated with a given user, and obtain an image 22 of a previously purchased fresh food product 21 from a mobile wireless communications device 30 associated with the given user upon initiating a mobile return of the previously purchased fresh food product based upon the image. The method also includes using the fresh food return processing server 40 to provide the image 22 of the previously purchased fresh food product 21 to a machine learning algorithm 43 to train the machine learning algorithm to identify the previously purchased fresh food product from the image, and verify a purchase by the given user of the previously purchased fresh food product based upon comparing the identification of the image of the previously purchased fresh food product via the machine learning algorithm and the product purchase history 24 associated with the given user. The method also includes using the fresh food return processing server 40 to generate and communicate a user credit 25 redeemable toward a future purchase based upon verifying the purchase by the given user.

A computer readable medium aspect is directed to a non-transitory computer readable medium for processing a fresh food return. The non-transitory computer readable medium includes computer executable instructions that when executed by a processor 41 cause the processor to perform operations. The operations include storing a product purchase history 24 associated with the given user, and obtaining an image 22 of a previously purchased fresh food product 21 from a mobile wireless communications device 30 upon initiating a mobile return of the previously purchased fresh food product based upon the image. The operations also include providing the image 22 of the previously purchased fresh food product 21 to a machine learning algorithm 43 to train the machine learning algorithm to identify the previously purchased fresh food product from the image. The operations further include verifying a purchase by the given user of the previously purchased fresh food product 21 based upon comparing the identification of the image 22 of the previously purchased fresh food product via the machine learning algorithm 43 and the product purchase history 24 associated with the given user, and generating and communicating a user credit 25 redeemable toward a future purchase based upon verifying the purchase by the given user.

While several embodiments have been described herein, it should be appreciated by those skilled in the art that any element or elements from one or more embodiments may be used with any other element or elements from any other embodiment or embodiments. Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A fresh food return processing system comprising:
   a mobile wireless communications device associated with
      a given user and configured to
      obtain an image of a previously purchased fresh food product, and
      initiate a mobile return of the previously purchased fresh food product based upon the image; and
   a fresh food return processing server configured to
      store a product purchase history associated with the given user,
      obtain the image of the previously purchased fresh food product from the mobile wireless communications device, provide the image of the previously purchased fresh food product to a machine learning algorithm to train the machine learning algorithm to identify the previously purchased fresh food product from the image based upon matching of pixels of the image to pixels of a baseline image, the machine learning algorithm being updated as the image is identified based upon updating of the baseline image, verify a purchase by the given user of the previously purchased fresh food product based upon comparing the identification of the image of the previously purchased fresh food product via the machine learning algorithm and the product purchase history associated with the given user, and generate and communicate a user credit redeemable toward a future purchase based upon verifying the purchase by the given user.

2. The fresh food return processing system of claim 1 wherein the fresh food return processing server is configured to generate and communicate a digital promotion redeemable toward a future purchase of a given product for purchase based upon verifying the purchase by the given user.

3. The fresh food return processing system of claim 1 wherein the fresh food return processing server is configured to generate a risk score associated with the given user based upon a number of previously returned products, and generate and communicate the user credit based upon the risk score.

4. The fresh food return processing system of claim 3 wherein the fresh food return processing server is configured to discontinue the mobile return based upon the risk score.

5. The fresh food return processing system of claim 4 wherein the fresh food return processing server is configured to cooperate with the mobile wireless communications device to prompt the given user to return the previously purchased fresh food product at a physical store.

6. The fresh food return processing system of claim 1 wherein the fresh food return processing server is configured to:

determine, based upon the machine learning algorithm, a determined reason for the mobile return;

cooperate with the mobile wireless communications device to prompt the given user to provide a stated reason for the mobile return; and train the machine learning algorithm with respect to the determined reason based upon the stated reason for the mobile return.

7. The fresh food return processing system of claim 1 wherein the fresh food return processing server is configured to prompt the given user to provide a user identifier, obtain the user identifier from the mobile wireless communications device, and obtain the product purchase history based upon the user identifier.

8. The fresh food return processing system of claim 1 wherein the fresh food return processing server is configured to:

obtain a receipt image having the previously purchased fresh food product thereon;

perform an optical character recognition of the receipt image to obtain at least one purchased product description; and verify the purchase of the previously purchased fresh food product based upon comparing the identification of the image of the previously purchased fresh food product to the at least one purchased product description.

9. A fresh food return processing server comprising:
a processor and an associated memory configured to
store a product purchase history associated with a given user;

obtain an image of a previously purchased fresh food product from a mobile wireless communications device associated with the given user upon initiation of a mobile return of the previously purchased fresh food product based upon the image;

provide the image of the previously purchased fresh food product to a machine learning algorithm to train the machine learning algorithm to identify the previously purchased fresh food product from the image based upon matching of pixels of the image to pixels of a baseline image, the machine learning algorithm being updated as the image is identified based upon updating of the baseline image;

verify a purchase by the given user of the previously purchased fresh food product based upon comparing the identification of the image of the previously purchased fresh food product via the machine learning algorithm and the product purchase history associated with the given user; and generate and communicate a user credit redeemable toward a future purchase based upon verifying the purchase by the given user.

10. The fresh food return processing server of claim 9 wherein the processor is configured to generate and communicate a digital promotion redeemable toward a future purchase of a given product for purchase based upon verifying the purchase by the given user.

11. The fresh food return processing server of claim 9 wherein the processor is configured to generate a risk score associated with the given user based upon a number of previously returned products, and generate and communicate the user credit based upon the risk score.

12. The fresh food return processing server of claim 9 wherein the processor is configured to:

determine, based upon the machine learning algorithm, a determined reason for the mobile return;

cooperate with the mobile wireless communications device to prompt the given user to provide a stated reason for the mobile return; and train the machine learning algorithm with respect to the determined reason based upon the stated reason for the mobile return.

13. The fresh food return processing server of claim 9 wherein the server is configured to prompt the given user to provide a user identifier, obtain the user identifier from the mobile wireless communications device, and obtain the product purchase history based upon the user identifier.

14. The fresh food return processing server of claim 9 wherein the processor is configured to:

obtain a receipt image having the previously purchased fresh food product thereon;

perform an optical character recognition of the receipt image to obtain at least one purchased product description; and verify the purchase of the previously purchased fresh food product based upon comparing the identification of the image of the previously purchased fresh food product to the at least one purchased product description.

15. A method of processing a fresh food return comprising:

using a fresh food return processing server to
store a product purchase history associated with a given user;
obtain an image of a previously purchased fresh food product from a mobile wireless communications device associated with the given user upon initiating a mobile return of the previously purchased fresh food product based upon the image;

provide the image of the previously purchased fresh food product to a machine learning algorithm to train the machine learning algorithm to identify the previously purchased fresh food product from the image based upon matching of pixels of the image to pixels of a baseline image, the machine learning algorithm being updated as the image is identified based upon updating of the baseline image;

verify a purchase by the given user of the previously purchased fresh food product based upon comparing the identification of the image of the previously purchased fresh food product via the machine learning algorithm and the product purchase history associated with the given user; and generate and communicate a user credit redeemable toward a future purchase based upon verifying the purchase by the given user.

16. The method of claim 15 wherein using the fresh food return processing server comprises using the fresh food return processing server to generate and communicate a digital promotion redeemable toward a future purchase of a given product for purchase based upon verifying the purchase by the given user.

17. The method of claim 15 wherein using the fresh food return processing server comprises using the fresh food return processing server to generate a risk score associated with the given user based upon a number of previously returned products, and generate and communicate the user credit based upon the risk score.

18. The method of claim 15 wherein using the fresh food return processing server comprises using the fresh food return processing server to:

determine, based upon the machine learning algorithm, a determined reason for the mobile return;

cooperate with the mobile wireless communications device to prompt the given user to provide a stated reason for the mobile return; and train the machine learning algorithm with respect to the determined reason based upon the stated reason for the mobile return.

19. The method of claim 15 wherein using the fresh food return processing server comprises using the fresh food return processing server to:

obtain a receipt image having the previously purchased fresh food product thereon;

perform an optical character recognition of the receipt image to obtain at least one purchased product description; and verify the purchase of the previously purchased fresh food product based upon comparing the identification of the image of the previously purchased fresh food product to the at least one purchased product description.

20. A non-transitory computer readable medium for processing a fresh food return, the non-transitory computer readable medium comprising computer executable instructions that when executed by a processor cause the processor to perform operations comprising:

storing a product purchase history associated with a given user;

obtaining an image of a previously purchased fresh food product from a mobile wireless communications device associated with the given user upon initiating a mobile return of the previously purchased fresh food product based upon the image;

providing the image of the previously purchased fresh food product to a machine learning algorithm to train the machine learning algorithm to identify the previously purchased fresh food product from the image based upon matching of pixels of the image to pixels of a baseline image, the machine learning algorithm being updated as the image is identified based upon updating of the baseline image;

verifying a purchase by the given user of the previously purchased fresh food product based upon comparing the identification of the image of the previously purchased fresh food product via the machine learning algorithm and the product purchase history associated with the given user; and generating and communicating a user credit redeemable toward a future purchase based upon verifying the purchase by the given user.

21. The non-transitory computer readable medium of claim 20 wherein the operations comprise generating and communicating a digital promotion redeemable toward a future purchase of a given product for purchase based upon verifying the purchase by the given user.

22. The non-transitory computer readable medium of claim 20 wherein the operations comprise generating a risk score associated with the given user based upon a number of previously returned products, and generate and communicate the user credit based upon the risk score.

23. The non-transitory computer readable medium of claim 20 wherein the operations comprise:

determining, based upon the machine learning algorithm, a determined reason for the mobile return;

cooperating with the mobile wireless communications device to prompt the given user to provide a stated reason for the mobile return; and training the machine learning algorithm with respect to the determined reason based upon the stated reason for the mobile return.

24. The non-transitory computer readable medium of claim 20 wherein the operations comprise:

obtaining a receipt image having the previously purchased fresh food product thereon;

performing an optical character recognition of the receipt image to obtain at least one purchased product description; and verifying the purchase of the previously purchased fresh food product based upon comparing the identification of the image of the previously purchased fresh food product to the at least one purchased product description.

\* \* \* \* \*